United States Patent

[11] 3,612,627

| | | |
|---|---|---|
| [72] | Inventor | Lawrence E. Fuller<br>Whittier, Calif. |
| [21] | Appl. No. | 860,287 |
| [22] | Filed | Sept. 23, 1969 |
| [45] | Patented | Oct. 12, 1971 |
| [73] | Assignee | Byron Jackson, Inc.<br>Long Beach, Calif. |

[54] PIPE COLLAR WITH CORRUGATED-TYPE INSERT
8 Claims, 9 Drawing Figs.

[52] U.S. Cl. .................................................. 308/4 A, 175/325
[51] Int. Cl. .................................................. F16c 1/26
[50] Field of Search .................................................. 308/4, 4 A; 138/178, 110, 96, 173; 175/325; 166/241; 287/108; 17/325, 323; 285/333

[56] References Cited

UNITED STATES PATENTS

| | | | |
|---|---|---|---|
| 3,449,022 | 6/1969 | Minor | 308/4 A |
| 3,425,757 | 2/1969 | Minor | 308/4 A |
| 2,959,453 | 11/1960 | Jacobs | 308/4 A |
| 3,051,532 | 8/1962 | Collett | 308/4 A |
| 3,094,360 | 6/1963 | Collett | 308/4 A |

Primary Examiner—Martin P. Schwadron
Assistant Examiner—R. H. Lazarus
Attorneys—Donald W. Banner, William S. McCurry and John W. Butcher

ABSTRACT: A generally cylindrical collar or protector adapted to be clamped into a drill pipe, and having adhesively bonded and embedded in the elastomeric body of the collar a generally cylindrical spring insert band with corrugated wall portions which are circumferentially distensible on application of a constrictive force to the protector to secure it around a pipe so that it is adaptive for conformity with pipe of varying diameters.

PATENTED OCT 12 1971 3,612,627

INVENTOR
LAWRENCE E. FULLER
BY John O. Evans, Jr.
ATTORNEY

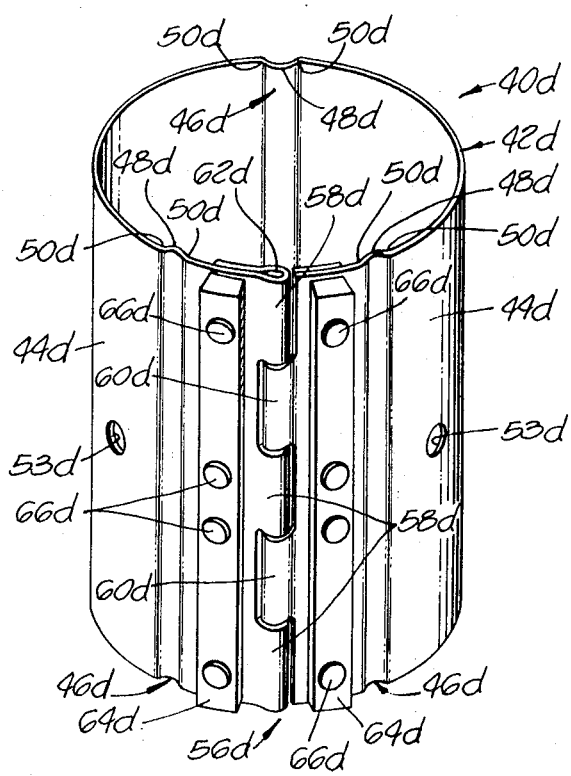
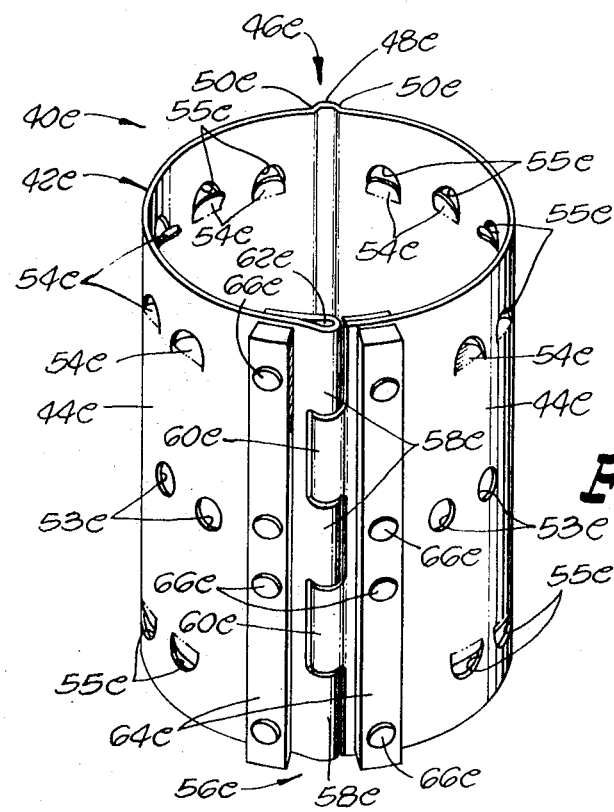

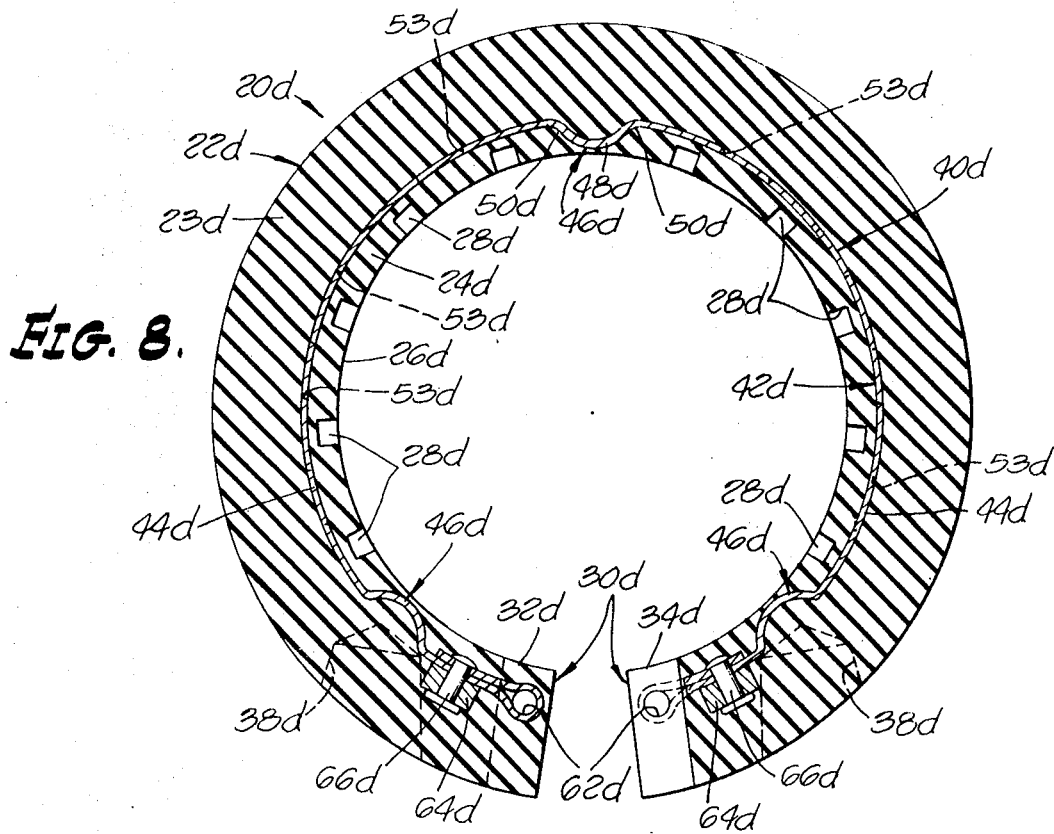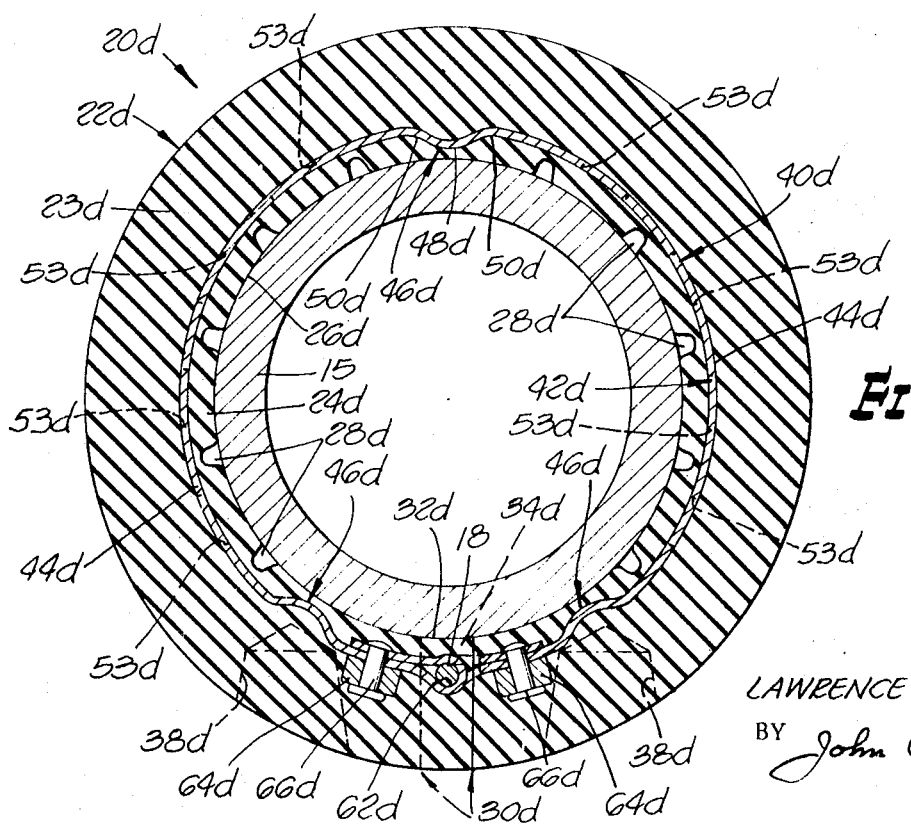

3,612,627

PIPE COLLAR WITH CORRUGATED-TYPE INSERT

BACKGROUND OF THE INVENTION

1. Field of the Invention

This invention relates to drill pipe protectors of the split or latch-on type which may be laterally opened to encircle a pipe, constricted by means of a constricting tool, and then secured to the pipe by means of a latch so as to serve as protective bearings as the pipe is rotated inside the casing of a well bore in rotary drilling of wells.

2. Description of the Prior Art

Extant in the prior art are split-type casing or drill pipe protectors which may be laterally installed onto the pipe, the protector sleeve including a longitudinal slit or opening on one side and with a cylindrical metal reinforcing sleeve or insert embedded and bonded in the elastomeric protector, the lateral ends of the insert adjacent to the protector slit providing means for constricting the protector and locking it in place about the pipe. Examples of the prior art are disclosed in U.S. Letters Pat Nos. 2,789,870 issued Apr. 23, 1967 to J. W. E. Hanes; 2,959,453 issued Nov. 8, 1960 to H. C. Jacobs; 3,019,063 issued Jan. 30, 1962 to C. H. Collett; and 3,051,532 issued Aug. 28, 1962 to C. H. Collett. The primary deficiencies of latch-on protectors of the prior art have been that the inserts of certain of them have had no provision for flexibility to accommodate or conform to pipe of varying diameters; and where the inserts have provided for expansion, it was not limited or controlled, resulting in looseness and slippage on the pipe, particularly when the latter is worn or undersize.

SUMMARY OF THE INVENTION

In order to overcome the shortcomings heretofore encountered in split or latch-on type drill pipe collars or protectors, therefore, it is a primary object of this invention to provide a protector conformable to pipe diameters in the range of acceptable manufacturing tolerances, as well as to worn or encrusted pipe.

Another object of the invention is to provide a protector capable of constriction without the exertion of excessive force and without overstressing the metal components of the spring band insert.

An additional object of this invention is to provide a drill pipe protector which exerts substantially a uniform constricting grip on undersize, nominal size, or oversize pipe.

A further object of the invention is to provide a protector with a dilative reinforcing band or sleeve adapted to flex with the movement of the surrounding rubber and to exert a uniform distribution of induced stress throughout the circumference of the rubber and band of the protector.

Still another object of this invention is to provide a protector with a metal reinforcing and supporting insert for a split drill pipe protector which exerts a substantially uniformly distributed force against the pipe for optimum gripping properties and without concentrated stress against the pipe surface. Briefly, the invention resides in a pipe collar adapted to encompass a pipe for securement thereon, including: a substantially cylindrical body comprising elastomeric material having a lateral opening therein: a spring band embedded in the body, substantially coextensive therewith, with a continuous layer of the elastomeric material between the band and the inner peripheral portion of the body; the band having latch means for locking the collar under tension about the pipe; and the band having alternate substantially circular cylindrical portions and longitudinal corrugated portions, the corrugated portions comprising less than half of the circumferential extent of the band and being distensible whereby to extend the band circumferentially by radial movement of the corrugated portions when the collar is stretched for securement about a pipe; the corrugated portions each comprise a single longitudinal crest.

BRIEF DESCRIPTION OF THE DRAWINGS

FIG. 6 is a perspective view of an additional form of spring insert band;

FIG. 7 is a perspective view of another additional form of spring insert band;

FIG. 8 is a cross-sectional view of the collar on an enlarged scale taken on a plane perpendicular to its axis showing the insert band as embodied in FIG. 6, the collar being in its normal position with the lateral opening ajar; and FIG. 9 is a cross-sectional view of the collar of FIG. 8 secured about a pipe.

DESCRIPTION OF THE PREFERRED EMBODIMENTS

Figure 1:
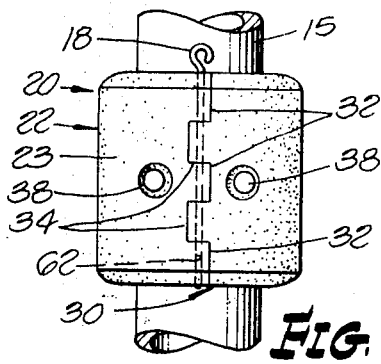
FIG. 1 is a view in elevation of a pipe collar on an enlarged scale in accordance with the invention shown installed on a pipe.

In FIG. 1 is shown a pipe collar or protector 20 which has been constricted about a length of drill pipe 15 by means of a constricting tool (not shown), which engages the outer portion 23 of the protector body 22 through the constricting tool holes 38 to close the lateral opening 30 of the collar 20 by interengaging the three fingers 32 with the two fingers 34 so that the latch pin 18 may be inserted through the aligned hole 62 of the intermeshed fingers 32, 34.

Figure 2:
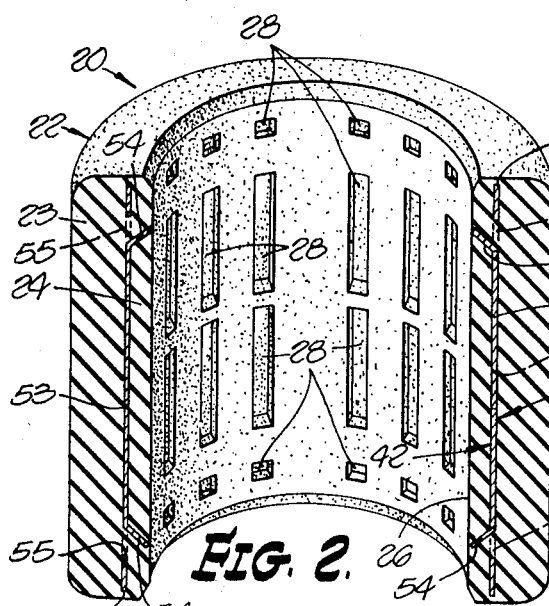
FIG. 2 is a longitudinal sectional view in perspective of the collar taken on a plane passing through its axis and substantially 90° from the lateral opening.

FIG. 2 shows the spring insert band 40 embedded in the elastomeric body 22 of the collar 20 so that there is an outer annular portion 23 extending radially outward from the insert 40 and an inner annular portion 24 extending radially inward from the insert 40 to the inner periphery 26 of the protector collar 20, the two portions 23, 24 being connected around the ends of the band 40 by the elastomeric end portions 25 and through the flow holes 53 and pierced openings 55 in the cylindrical portion 44 of the insert body 42. Longitudinal relief grooves 28 extend radially from the inner periphery 26 outward toward the insert 40. The insert body 42 may have prongs 54 extending inwardly to the inner periphery 26 of the collar 20 at each of the pierced openings 55.

Figure 3:
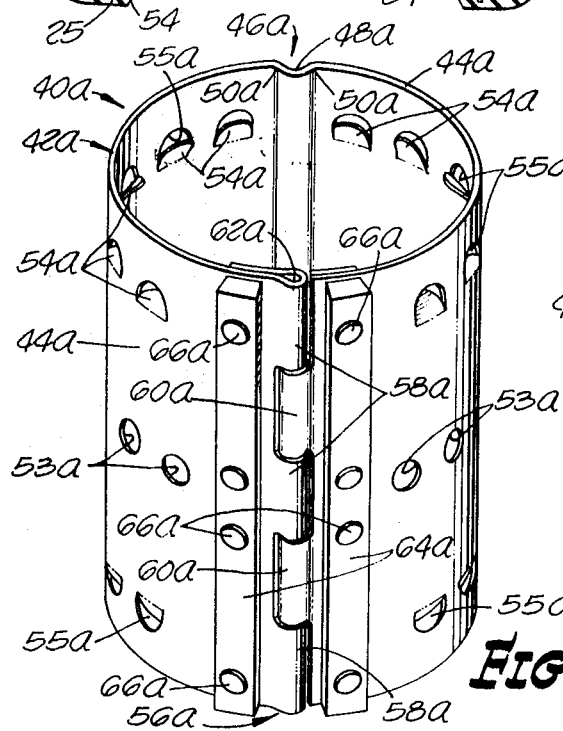
FIG. 3 is a perspective view of one form of spring insert band.

In FIG. 3 is shown one form of spring insert band 40a. It has a single longitudinal corrugation 46a in the body portion 42a of the band 40a, the corrugation being opposite or substantially 180° from the latch 56a. The crest 48a of the corrugation 46a extends radially inward and blends into the circular cylindrical portions 44a, 44a of the body 42a with lateral fillet portions 50a, 50a. Circumferentially spaced around and extending through the circular cylindrical portions 44a, 44a of the body 42a, intermediate its ends, is a row of flowholes 53a, and adjacent to the ends of the circular portions 44a, 44a two rows of pierced openings 55a, providing two rows of prongs 54 a directed angularly inward from the circular cylindrical portions 44a, 44a. The latch 56a is formed of looped-back ends of the band 40a, one end terminating in three loops 58a and the other end in two loops 60 a to provide an aligned pin-receiving hole 62a when the loops 58 a, 60a are intermeshed. The loops 58a, 60 a are secured by means of rivets 66a extending through each of the loops and a reinforcing bar 64a.

Figure 4:
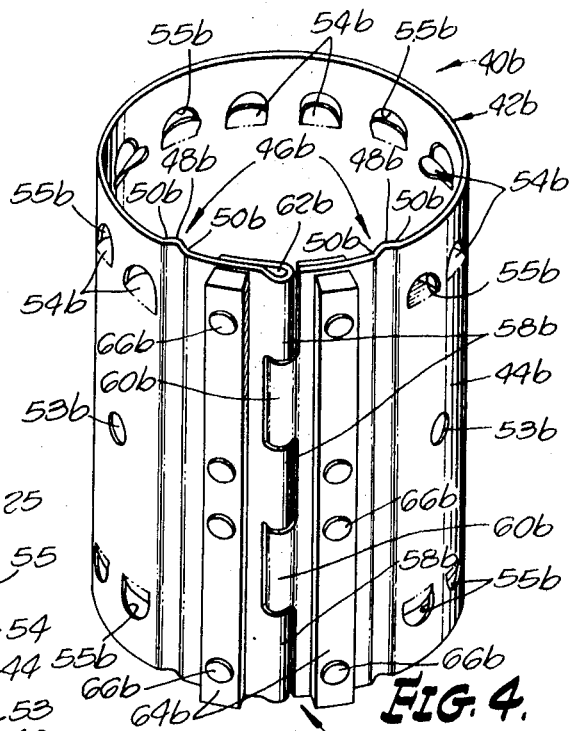
FIG. 4 is a perspective view of another form of spring insert band.

In FIG. 4 is shown another form of spring insert band 40b, the respective components being designated by the same reference numerals as those of FIG. 3, but using the suffix letter b. The body portion 42b has two longitudinal, radially inwardly directed corrugations 46b, positioned at either side of the latch 56b.

Figure 5:
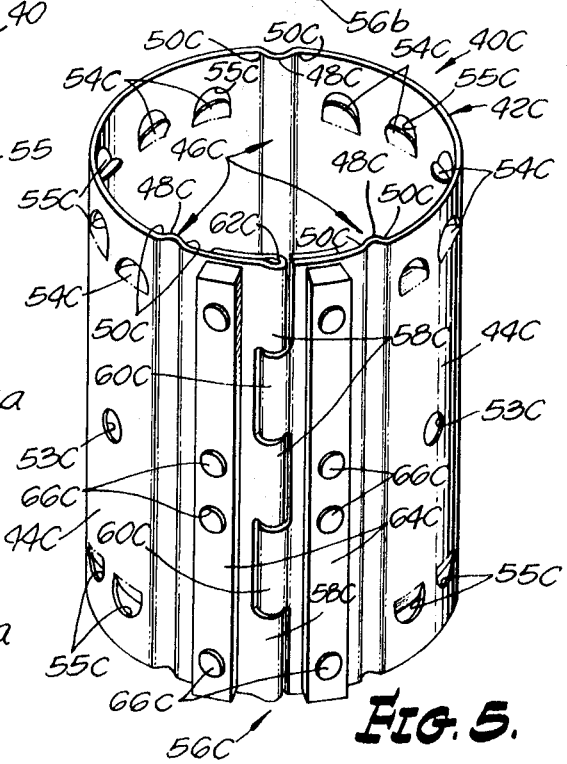
FIG. 5 is a perspective view of still another form of spring insert band.

In FIG. 5 is shown a third form of spring insert band 40c, the respective components being designated by the same reference numerals as those of FIGS. 3 and 4, but using the suffix letter c. The body portion 42c has three longitudinal, radially inwardly directed corrugations 46c, one of them positioned substantially opposite or 180° from the latch 56c and the other two at either side of the latch.

In FIG. 6 is shown a fourth form of spring insert band 40d, the respective components being designated by the same reference numerals as those of FIGS. 3, 4, 5, but using the suffix letter d. The body portion 42d has three longitudinal, radially inwardly directed corrugations 46d, one of them positioned substantially opposite or 180° from the latch 56d and the other two at either side of the latch. The band 40d has no prongs or prong openings.

In FIG. 7 is shown a fifth form of spring insert band 40e, the respective components being designated by the same reference numerals as those of FIGS. 3, 4, 5, and 6, but using the suffix letter e. The body portion 42e has one longitudinal corrugation 46e opposite or substantially 180° from the latch 56e. The crest 48e extends radially outward and blends into the cylindrical portions 44e, 44e of the body 42e with lateral fillet portions 50e, 50e.

FIG. 8 shows one form of pipe collar 20d exemplary of the preferred embodiment of the invention in the uninstalled configuration with its lateral opening 30d ajar. The collar 20d includes the fourth form of reinforcing spring insert band 40d (FIG. 6), embedded so that there is an inner annular sleeve 24d of elastomeric material adjacent to the inner periphery 26d of the protector 20d and an outer annular sleeve 23d making up the outer portion of the body 22d, the three lateral corrugations 46d being spaced about the band 40d as described above in reference to FIG. 6. The longitudinal grooves 28d extend radially outward from the inner periphery 26d into the inner annular elastomeric portion 24d.

Referring to FIG. 9, the pipe collar or protector 20d is shown stretched or distended with its inner periphery 26d in engagement with the pipe 15 on which it has been installed, the lateral opening 30d being closed by interengagement of the three fingers 32d with the two fingers 34d to align the pie hole 62d to receive the latch pin 18.

In a typical operation using a drill pipe collar or casing protector 20d as depicted in FIGS. 8 and 9, a rubber material to form the body 22d is molded and adhesively bonded to the reinforcing spring insert band 40d (FIG. 6), employing the usual method of curing by applying heat and pressure, the procedure being well-known to those skilled in the art of rubber molding. To supplement the adhesive bond, a mechanical bonding is also obtained by flow of the rubber material of the body 22d around the ends of the insert 40d and through the flowholes 53d, thus tying together the outer portion 23d and the inner portion 24d of the elastomeric body 22d, as visualized by reference to FIGS. 2, 6, and 8. As shown in FIGS. 1 and 8, the protector 20d is formed with a tongue-and-groove lateral opening 30d, one side of the opening 30d having three fingers 32d and the other side two fingers 34d, the fingers 32d, 34 d being intermeshable so that the pinhole 62d may be axially aligned. The circumference of the inner periphery 26d of the protector 20d is made smaller than the outside circumference of the pipe 15 on which it is to be installed so that the rubber body 22d and the band body 42d must be stretched or expanded to encircle the pipe 15, thus assuring a tight engagement therebetween to preclude slippage. In FIG. 9, the collar 20d is shown installed around the pipe 15, and secured in place by means of the latch pin 18 inserted through the aligned hole 62d. See also FIG. 1. The installation is accomplished by spreading the opening 30d wide enough to pass the pipe 15 to align the collar 20d therewith, inserting the jaws of a constricting tool (not shown) into the holes 38d to bear against the reinforcing bars 64d to converge the opening until the hole 62d is aligned for insertion of the lock pin 18, as seen in FIGS. 1 and 9. As the rubber body 22d is stretched or dilated to encircle the pipe 15, the inner periphery 26d of the collar 20d is in contact with the pipe 15, and the annular elastomeric portion 24d is substantially confined between the pipe 15 and the band 40d so as to create a hoop tension in the band body 42 d tending to elongate the corrugations 46d by urging the lateral crests 48d and fillets 50d by radial movement toward circumferential alignment with the cylindrical portions 44d, as seen in FIG. 9. Because of the distensibility obtainable by the inclusion of the longitudinal corrugations 46d in the body 42d of the band 40d, adaptability to encrusted, worn or oversize and undersize pipe is feasible. By providing rubber between the crests 48d and the inner periphery 26d, contact of metal with the pipe 15 and resultant wear are avoided; and the smooth transition from the crests 48d to the cylindrical portions 42d by the intermediate fillet portions 50d avoids concentrations of stress in the body 42d, which could result in premature failure. A radial extent of the crests 48d of from one-half to fifteen-sixteenths of the annular rubber thickness 24d has been found to be desirable, and variations of those limits may be used further to obtain desired expansibility and pliability of the band 40d. By spacing the lateral corrugations 46d substantially uniformly about the body 42d, a uniform hoop tension and distribution of stress about the body 42d of the band 40d results. Further reduction in stress is obtained by the provision of relief grooves 28d and flowholes 53d, which allow for displacement of the annular rubber portion 24d confined between the pipe 15 and the band 40d as the collar 20d is constructed about the pipe.

In FIG. 3 is shown an embodiment of the spring insert band 40a which has a single longitudinal corrugation 46a, as described hereinabove. When molded with rubber to form a collar, similarly as described above in reference to collar 20d, the band 40a would allow a limited degree of extension or stretching of the band 40a, the degree determined by the circumferential extension of the one corrugation 46a, thus delimiting and controlling the expansibility of the pipe collar in which it is embedded, and assuring a tight grip of the collar on pipe with little or no diameter variation.

A protector or collar molded as described previously, and comprising the insert band 40b (FIG. 4) having two corrugations 46b, one at either side of the latch 56b would thereby provide a distensibility of about twice that provided by an insert with only one longitudinal corrugation (insert 40a of FIG. 3), assuming the corrugations are of substantially equivalent dimensions. It would therefore allow for about twice as much variation in incremental oversize of the pipe.

A protector or collar molded as described previously, and comprising the insert band 40c (FIG. 5) having three corrugations 46c, would be similar in configuration and operation to that described hereinabove in reference to the insert and collars of FIGS. 6, 8 and 9. Insert band 40c, however, provides two circumferential rows of prongs 54c with their prong openings 55c adjacent to the ends of the cylindrical portions 44c. The prongs 54c serve to space the portions 44c from the pipe so as to control the expansibility of the band 40c by substantially confining its radial movement to the areas of the longitudinal corrugations 46c.

A protector or collar molded as described above, and including the insert band 40e (FIG. 7) which has a single, outwardly extending longitudinal corrugation 46e on the side of the body 42e opposite the latch 56e, would have a distensibility substantially equivalent to that of band 40a with its single inwardly extending corrugation 46a as described previously in reference to FIG. 3.

The pliability of the pipe collars or protectors 20 and their extensibility and adaptability to conform to pipe 15 of nonuniform diameter may thus be controlled and limited by the number and size of the longitudinal corrugations 46 in the insert 40 to vary its circumferential expansion, by the provision of supporting prongs 54 to localize the circumferential expansion of the insert, and by the provisions of relief grooves 28 and flowholes 53 and openings 55 to facilitate movement of the rubber and constriction of the collar about the pipe.

While the description above refers primarily to the use of the collars of this invention as applied to drill pipe, they may be applied with similar advantage in other installations in which an encircling collar must be distensible in order to fit and accommodate cylindrical surfaces, the outside diameters of which are not always constant.

Additionally, while the preferred embodiment of the invention has been shown and described as in the form embodied in FIGS. 8 and 9, having the distensible cylindric spring band of FIG. 6 (three inward corrugations), as well as those having the embodiments of FIG. 3 (one inward corrugation and prongs), FIG. 4 (two inward corrugations and prongs), FIG. 5 (three inward corrugations and prongs), and FIG. 7 (one outward corrugation and prongs), other combinations and forms with distensible corrugated bands involving minor changes from those described and shown could be made without departing from this invention.

I claim:

1. A pipe collar adapted to encompass a pipe for securement thereon, including:
   a. a substantially cylindrical body comprising elastomeric material having a lateral opening therein;
   b. a spring band embedded in said body, substantially coextensive therewith, with a continuous layer of said elastomeric material between said band and the inner peripheral portion of said body;
   c. said band having latch means for locking said collar under tension about the pipe; and
   d. said band having alternate substantially circular cylindrical portions and longitudinal corrugated portions, said corrugated portions comprising less than half of the circumferential extent of said band and being distensible whereby to extend said band circumferentially by radial movement of said corrugated portions when said collar is stretched for securement about a pipe;
   e. said corrugated portions each comprise a single longitudinal crest.

2. A pipe collar as defined in claim 1 including:
   one of said crests disposed substantially 180° from said lateral opening.

3. A pipe collar as defined in claim 1 including:
   two of said crests, one disposed at either side of said lateral opening.

4. A pipe collar as defined in claim 1 including:
   three of said crests, one disposed substantially 180° from said lateral opening and one at either side of said lateral opening.

5. A pipe collar as defined in claim 1 wherein:
   said crests extend radially inward from said substantially circular cylindrical portion of said band.

6. A pipe collar as defined in claim 1 wherein:
   said crests extend radially outward from said substantially circular cylindrical portion of said band.

7. A pipe collar as defined in claim 1 wherein:
   said crests extend radially from said substantially circular cylindrical portion of said band a distance of from one-half to fifteen-sixteenths of the thickness of said layer of elastomeric material.

8. A pipe collar as defined in claim 1 wherein said band includes more than one circular cylindrical portion separated by a longitudinal corrugated portion.